(12) United States Patent
Stamm et al.

(10) Patent No.: US 7,427,043 B2
(45) Date of Patent: Sep. 23, 2008

(54) TAPE CARTRIDGE WITH MULTIPLE KEYING FEATURES

(75) Inventors: Stephen Stamm, Fort Lupton, CO (US); Don Armstrong, Arvada, CO (US); James Justin Kuhar, Broomfield, CO (US)

(73) Assignee: Quantrum Corporation, San Jose, CA (US)

( * ) Notice: Subject to any disclaimer, the term of this patent is extended or adjusted under 35 U.S.C. 154(b) by 208 days.

(21) Appl. No.: 10/225,760

(22) Filed: Aug. 22, 2002

(65) Prior Publication Data

US 2004/0035969 A1 Feb. 26, 2004

(51) Int. Cl.
*G11B 23/107* (2006.01)

(52) U.S. Cl. ...................................... 242/338

(58) Field of Classification Search ................. 242/336, 242/338, 338.2, 338.4, 337, 337.1, 347, 352.3, 242/356.5, 356.6; 360/96.1, 96.5, 96.6, 132

See application file for complete search history.

(56) References Cited

U.S. PATENT DOCUMENTS

| | | | | |
|---|---|---|---|---|
| 3,692,255 A | * | 9/1972 | Von Behren | 242/352.4 |
| 4,008,490 A | * | 2/1977 | Lemelson | 360/132 |
| 4,786,996 A | * | 11/1988 | Ohtani et al. | 360/94 |
| 4,898,338 A | * | 2/1990 | Oishi | 242/347.1 |
| 5,016,127 A | * | 5/1991 | Inoue et al. | 360/94 |
| 5,480,103 A | * | 1/1996 | Gerfast et al. | 242/347 |
| 5,497,955 A | * | 3/1996 | Angellotti et al. | 242/338.4 |
| 5,558,291 A | * | 9/1996 | Anderson et al. | 242/336 |

(Continued)

FOREIGN PATENT DOCUMENTS

EP 0 405 661 A1 1/1991

(Continued)

*Primary Examiner*—Peter M. Cuomo
*Assistant Examiner*—Scott Haugland
(74) *Attorney, Agent, or Firm*—Roeder & Bruder LLP; James P. Broder

(57) ABSTRACT

A combination includes a family of cartridge drives (12) including a first cartridge drive and a second cartridge drive, and a family of cartridges (14) including a first cartridge and a second cartridge. The first cartridge drive includes a first protrusion pattern (32), and the second cartridge drive includes a second protrusion pattern (32) that is different than the first protrusion pattern (32). The first cartridge includes a first recess pattern (62) that receives the first protrusion pattern (32) thereby allowing full insertion of the first cartridge into the first cartridge drive. The second cartridge includes a second recess pattern (62) that receives the second protrusion pattern (32) thereby allowing full insertion of the second cartridge into the second cartridge drive. The second protrusion pattern (32) can impede full insertion of the first cartridge into the second cartridge drive. Further, the first protrusion pattern (32) can impede full insertion of the second cartridge into the first cartridge drive. The protrusion patterns (32) include protrusions (30) each having a protrusion length (70A-70D) which can vary between cartridge drives (12). The cartridge (14) includes a cartridge housing (34) having a cartridge rear wall (60) and a plurality of cartridge side walls (58). The recess patterns (62) can be positioned along one or more of the cartridge side walls (58) and/or the cartridge rear wall (60). The cartridge (14) includes a cartridge housing (34) that defines a housing interior (48). The recess pattern (62) can be configured to not allow access into the cartridge interior (48).

31 Claims, 10 Drawing Sheets

U.S. PATENT DOCUMENTS

| | | | |
|---|---|---|---|
| 5,779,172 A * | 7/1998 | Anderson et al. | 242/336 |
| 5,790,337 A * | 8/1998 | Steinberg et al. | 360/69 |
| 5,890,669 A * | 4/1999 | Buckland et al. | 242/336 |
| 6,095,445 A * | 8/2000 | Hentrich | 242/338 |
| 6,175,470 B1 | 1/2001 | Stamm | |
| 6,185,070 B1 | 2/2001 | Kumagai | |
| 6,205,001 B1 * | 3/2001 | Vanderheyden et al. | 360/132 |
| 6,270,030 B1 * | 8/2001 | Johnson et al. | 242/338 |
| 6,349,013 B1 | 2/2002 | Ichimura | |
| 6,570,841 B1 | 5/2003 | Nakashima | |

FOREIGN PATENT DOCUMENTS

| | | |
|---|---|---|
| EP | 0 434-143 A2 | 6/1991 |
| EP | 0 549 355 A2 | 6/1993 |
| EP | 03255141.8 | 5/2007 |
| WO | WO-94/29863 A | 12/1994 |
| WO | WO-03/043005 A | 5/2003 |

* cited by examiner

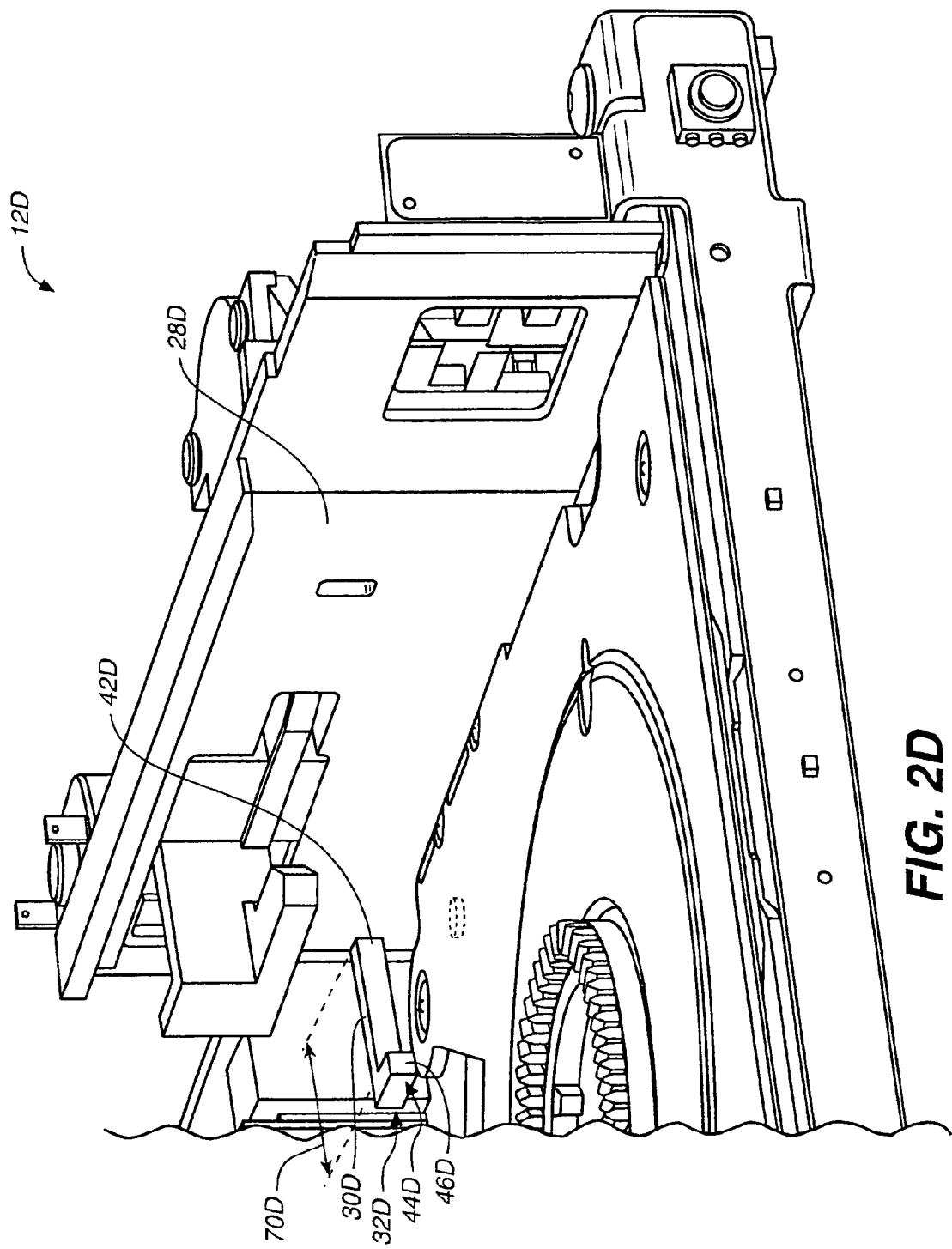

TAPE CARTRIDGE WITH MULTIPLE KEYING FEATURES

FIELD OF THE INVENTION

The invention relates generally to data storage, and more particularly to data storage systems and tape cartridges that contain the storage media.

BACKGROUND

Data storage systems can utilize a cartridge drive and a cartridge to magnetically store data in digital form which can be subsequently retrieved. In one type of digital data storage system, the cartridge drive includes a drive housing, a cartridge receiver, a take-up reel, a drive leader secured to the take-up reel, and a buckling mechanism. The cartridge includes a cartridge reel having a cartridge leader secured to a magnetic storage tape. The cartridge is inserted into the cartridge receiver. Upon insertion of the cartridge into the cartridge receiver, the buckling mechanism buckles the cartridge leader to the drive leader.

However, problems are currently arising with incompatibility between newer cartridges and comparatively older cartridge drives. For example, newer cartridges may be incompatible with certain older cartridge drives because the cartridge leader in the newer cartridges may not be able to successfully mate with the take-up leader of older cartridge drives, which can cause damage to the cartridge. Additionally, an older cartridge drive can have a braking system that is incompatible with a newer cartridge. Differences in braking systems can cause a fatal jam of the cartridge, and can therefore result in damage to the cartridge and/or the cartridge drive.

Further, in newer data storage systems, the cartridge drives can use enhanced read/write head structures and data processing electronics, which are capable of storing and processing increased lineal track and bit densities on the storage tapes of newer cartridges, as an example. If a cartridge that uses increased lineal track and bit densities is used with an older cartridge drive that does not incorporate the enhanced head structures and data processing electronics, the data previously stored on the cartridge can be overwritten and erased. As a result, newer cartridges that are recorded with these increased lineal track and bit densities may not be backwards compatible with older cartridge drives that do not include the enhanced read/write head structures and data processing electronics. However, older cartridges need to be compatible for use with future cartridge drives, as the archival data stored on older cartridges may be needed long after the older cartridge drive has been replaced by a newer model.

Additionally, the potential for future incompatibility problems is relatively high given the rapid development of updated and improved versions of cartridges and cartridge drives in the industry. For example, backward compatibility may not always be observed by manufacturers of cartridge drives and cartridges. Presently, many manufacturers of cartridge drives and their components utilize a standard form factor for the cartridges. This standard form factor has become prevalent in the industry. As a result, modifying the configuration of one generation of cartridges to distinguish older cartridges from newer cartridges is difficult without violating the standard form factor. Therefore, various challenges are presented in attempting to alleviate present and future compatibility issues.

Thus, a need exists for a compatibility scheme for a data storage system that utilizes a cartridge having the same form factor as an older cartridge, but which cannot be inserted into or used with incompatible, older cartridge drives. At the same time, whatever modification is made to prevent the usage of new cartridges in old cartridge drives cannot prevent the use of older cartridges in new cartridge drives. Thus, a further need exists to provide an efficient and cost effective way going forward for a cartridge drive to detect incompatibility with various generations of cartridges, and inhibit the potential for damage to the cartridge drive and/or loss of data.

SUMMARY

The present invention is directed toward a combination comprising a family of cartridge drives including a first cartridge drive and a second cartridge drive, and a family of cartridges including a first cartridge and a second cartridge. The first cartridge drive includes a first protrusion pattern, and the second cartridge drive includes a second protrusion pattern that is different than the first protrusion pattern. The first cartridge includes a first recess pattern that receives the first protrusion pattern thereby allowing full insertion of the first cartridge into the first cartridge drive. The second cartridge includes a second recess pattern that receives the second protrusion pattern thereby allowing full insertion of the second cartridge into the second cartridge drive. In one embodiment, the first protrusion pattern can impede full insertion of the second cartridge into the first cartridge drive. Further, the second protrusion pattern can allow full insertion of the first and second cartridges into the second cartridge drive. With this design, newer cartridge drives can be backwards compatible with older generations of cartridges, as well as newer cartridges.

In alternative embodiments, the first protrusion pattern includes a first protrusion having a first protrusion length, and the second protrusion pattern includes a second protrusion having a second protrusion length that is shorter than the first protrusion length.

The cartridge includes a cartridge housing having a cartridge rear wall and a plurality of cartridge side walls that are substantially perpendicular to the cartridge rear wall. In alternate embodiments, the recess pattern can be positioned along one or more of the cartridge side walls and/or the cartridge rear wall. In certain embodiments, the cartridges each includes a cartridge housing that defines a housing interior, and wherein at least one of the recess patterns does not allow access into the cartridge interior of the corresponding cartridge.

The present invention is also directed toward a cartridge, a cartridge drive, and a method for inhibiting insertion of an incompatible cartridge into a cartridge drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2D is a top perspective view of yet another embodiment of a portion of the cartridge drive;

DESCRIPTION

Figure 1:
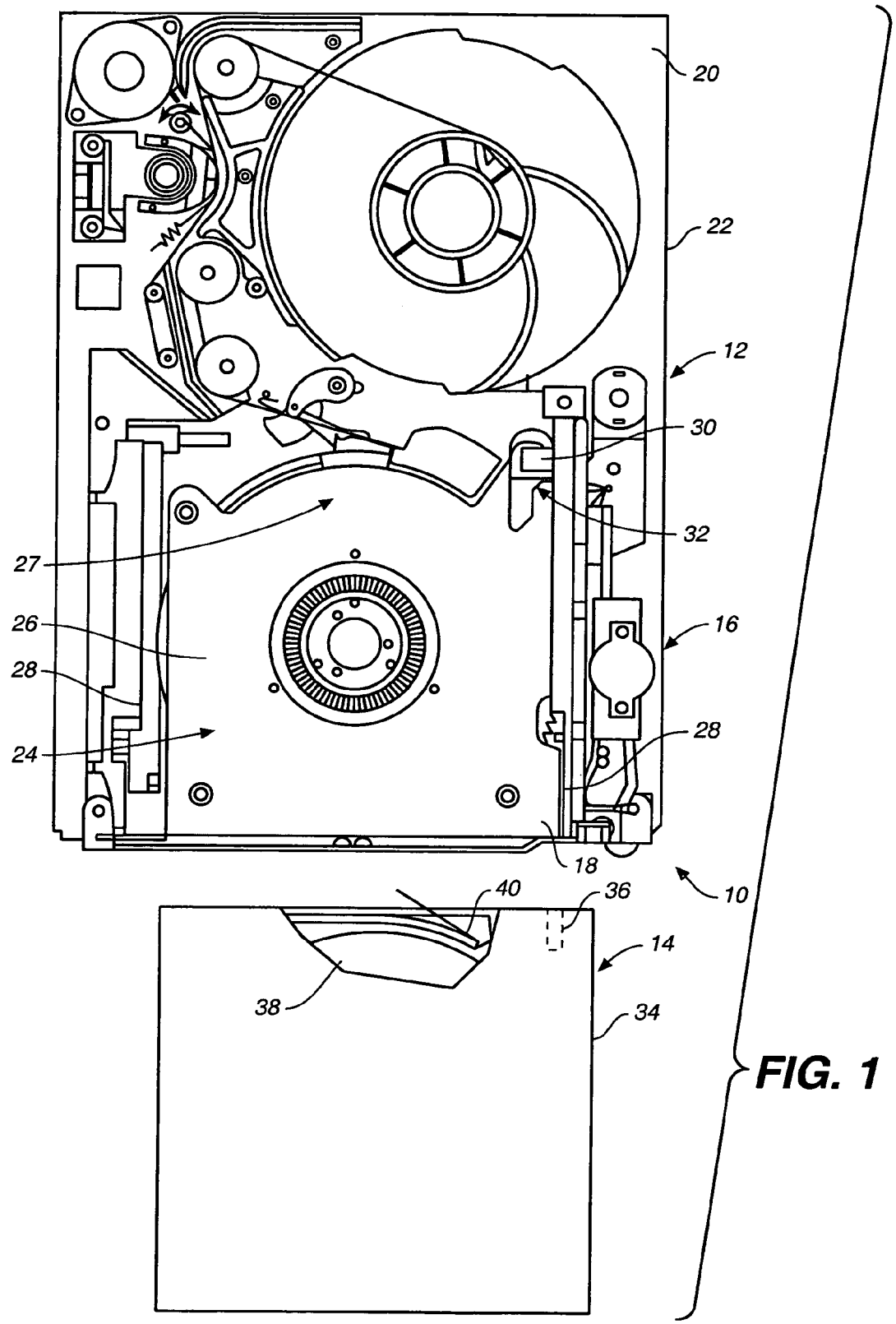
FIG. 1 is a top view of a data storage system including a portion of a cartridge drive and a partial cutaway view of a cartridge having features of the present invention.

FIG. 1 illustrates a data storage system 10 including a cartridge drive 12 and a cartridge 14 having features of the present invention. The cartridge drive 12 includes a drive housing 16 and a cartridge receiver 18. The drive housing 16 illustrated in FIG. 1 includes a drive base 20, a plurality of drive side walls 22 and a cover (not illustrated for clarity). The cartridge receiver 18 is generally rectangular and dimensioned to fully receive one of the cartridges 14. In this embodiment, the cartridge receiver 18 includes a receiver interior region 24, a receiver base 26, a receiver rear section 27, and two receiver walls 28.

In the embodiment illustrated in FIG. 1, the cartridge drive 12 also includes one or more raised protrusions 30 (illustrated partially in phantom) that extend from one of the receiver walls 28. In alternate embodiments, the protrusions 30 can extend from the receiver base 26 or another portion of the cartridge drive 12. The protrusions 30 form a protrusion pattern 32. Depending upon the protrusion pattern 32, the protrusions 30 can allow full insertion of the cartridge 14 into the cartridge receiver 18. Alternatively, the protrusions 30 can inhibit full insertion of the cartridge 14 into the cartridge receiver 18 by contacting a portion of the cartridge 14 prior to full insertion, thereby impeding progression of the cartridge 14 into the cartridge receiver 18. As used herein, a cartridge 14 that can be fully inserted into the cartridge receiver 18 is also referred to as a "compatible" cartridge, while a cartridge 14 that is impeded by the protrusions 30 can also be referred to as an "incompatible" cartridge. As illustrated in FIG. 1, each cartridge 14 includes a cartridge housing 34 having one or more recesses 36 (one recess 36 is illustrated in phantom), and a reel 38 which typically holds a magnetic storage tape 40.

Figure 2A:
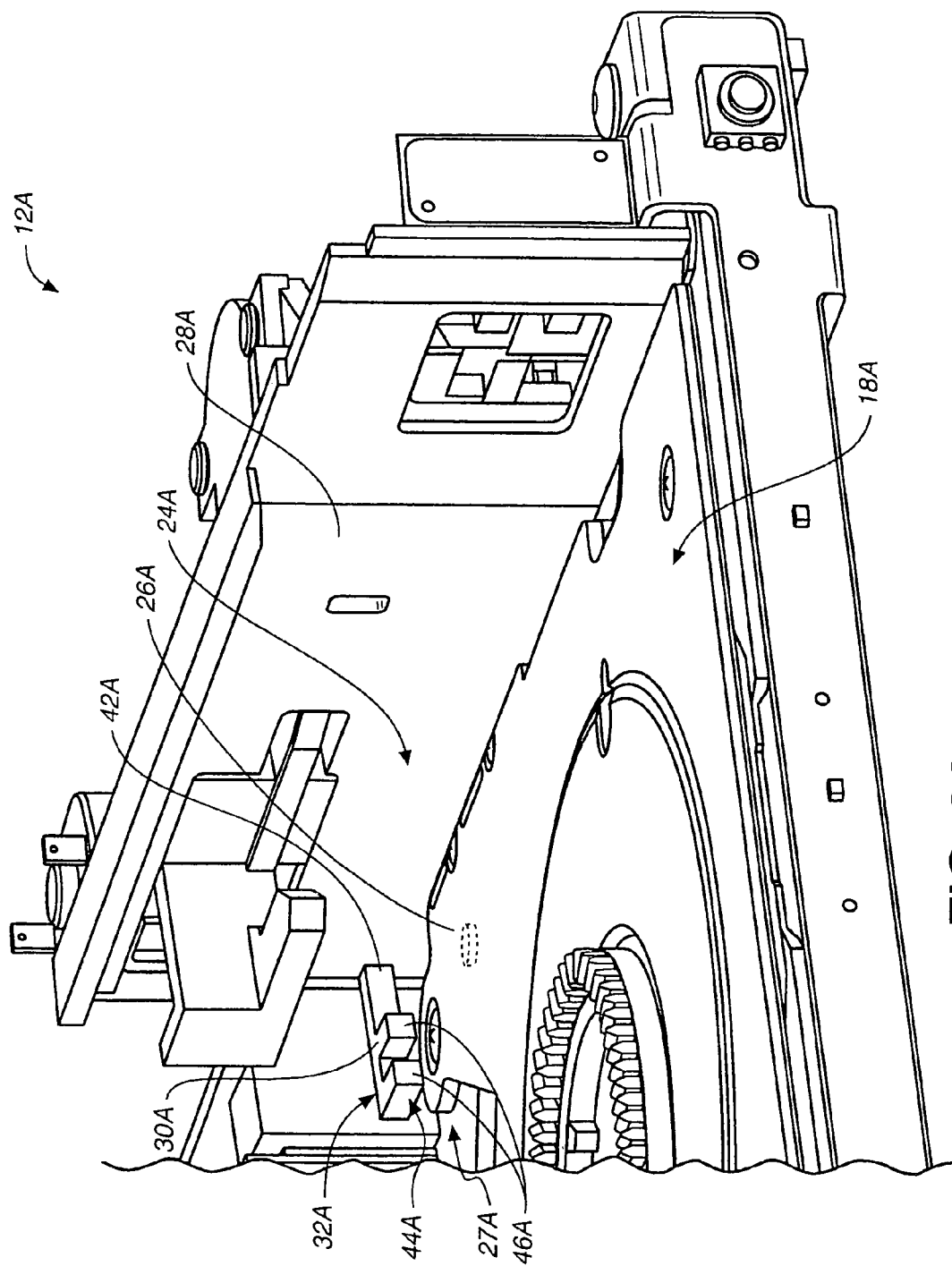
FIG. 2A is a top perspective view of an embodiment of a portion of the cartridge drive having features of the present invention.

FIG. 2A illustrates a first embodiment of a portion of the cartridge drive 12A, which includes the cartridge receiver 18A. The cartridge drive 12A illustrated in FIG. 2A can be one cartridge drive 12A in a family of cartridge drives. Only one receiver wall 28A is illustrated in FIG. 2A for clarity. In this embodiment, the protrusion pattern 32A includes one protrusion 30A that is substantially "F" shaped and cantilevers from the receiver wall 28A towards the receiver interior region 24 of the cartridge receiver 18A. In the embodiment illustrated in FIG. 2A, the protrusion 30A is positioned near the receiver rear section 27A. However, the protrusion can be positioned in other locations of the cartridge drive 12A. This protrusion 30A includes a support section 42A and a key section 44A. The length, positioning and overall geometry of the support section 42A can vary. In this embodiment, the support section 42A is substantially rectangular in shape, and is generally perpendicular to the receiver wall 28A. However, the support section 42A can be triangular, circular, oval or any other suitable shape. Further, the support section 42A can cantilever from the cartridge receiver 18A at angles which are not perpendicular to the receiver wall 28A, or the support section 42A can cantilever from the receiver base 26A.

The size, positioning and overall geometry of the key section 44A can be varied to suit the design requirements of the cartridge drive 12A and the cartridge 14 (illustrated in FIG. 1). In this embodiment, the key section 44A includes two key regions 46A. Each key region 46A in FIG. 2A has a substantially rectangular shaped cross-section. In alternative embodiments, each key region 46A can have a different shaped cross-section. For example, the cross-section of each key region 46A can be triangular, semi-circular, oval or any other suitable shape. As illustrated in FIG. 2A, the key section 44A can extend substantially perpendicularly from the support section 42A in a direction parallel with the direction of insertion of the cartridge 14 (illustrated in FIG. 1).

Figure 2B:
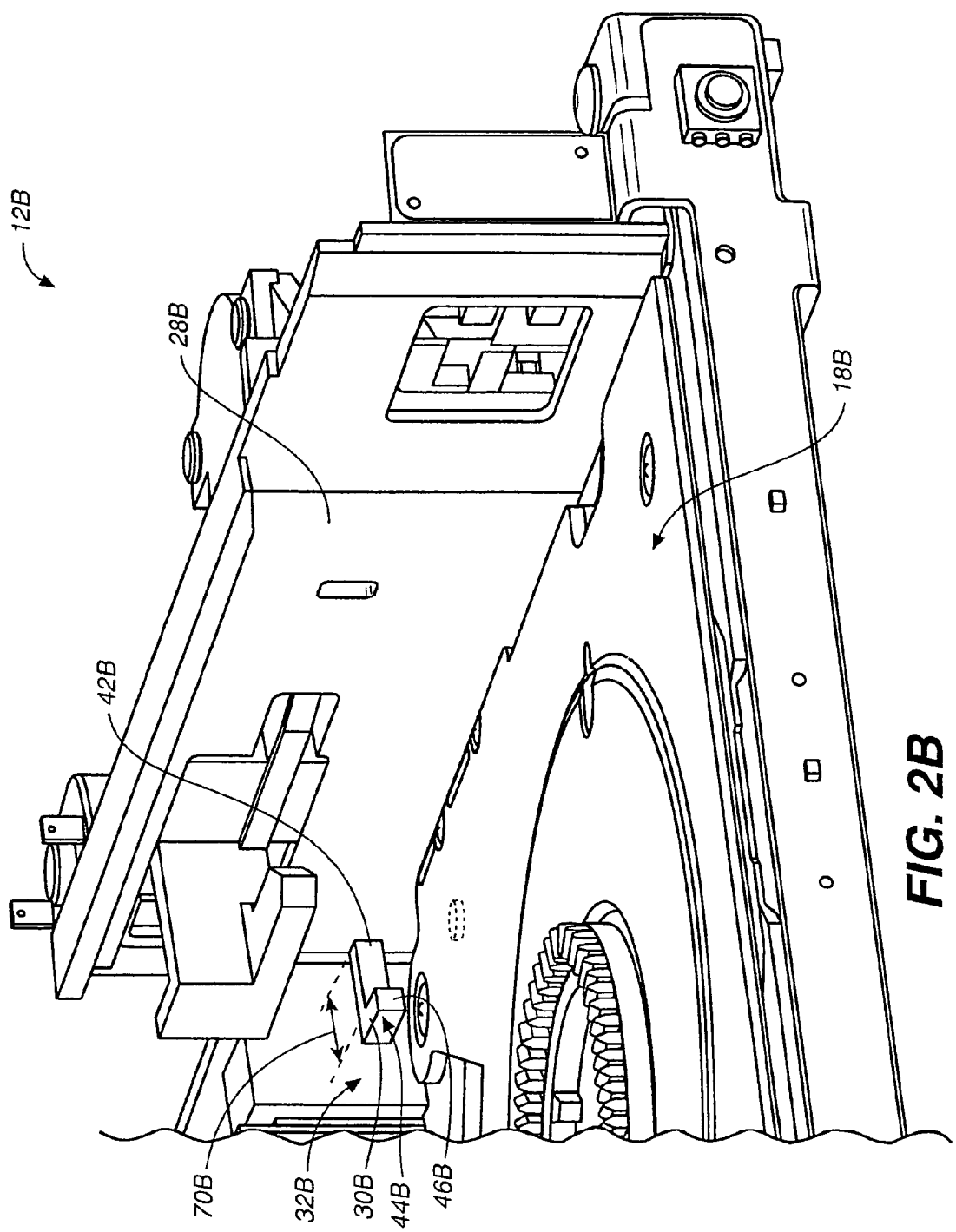
FIG. 2B is a top perspective view of another embodiment of a portion of the cartridge drive.
Figure 2C:
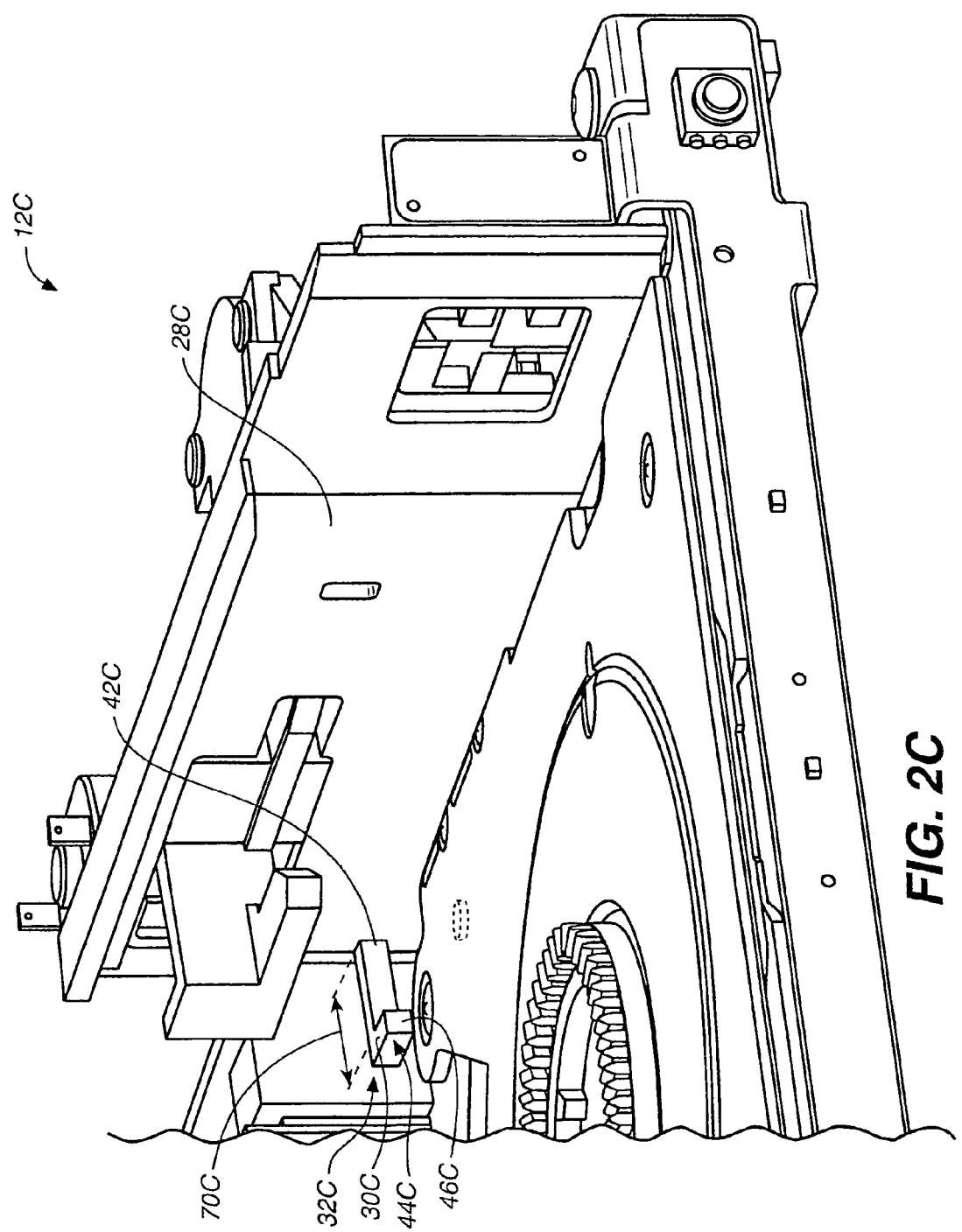
FIG. 2C is a top perspective view of still another embodiment of a portion of the cartridge drive.

FIGS. 2B-2D collectively illustrate additional cartridge drives 12B-12D that can be part of a family of cartridge drives. More specifically, FIG. 2B is a perspective view of another embodiment of a portion of the cartridge drive 12B, including a protrusion pattern 32B having a protrusion 30B that includes a support section 42B, and a key section that includes a key region 46B. Many of the features of this embodiment are substantially similar to the cartridge drive 12 illustrated in FIG. 2A. However, in FIG. 2B, the protrusion 30B is substantially "L" shaped, and cantilevers from the receiver wall 28B of the cartridge receiver 18B. The protrusion 30B has a protrusion length 70B that is measured from the receiver wall 28B to the portion of the key region 46B that is nearest the receiver wall 28B, as illustrated in FIG. 2B.

FIG. 2C illustrates a portion of the cartridge drive 12C, including a protrusion pattern 32C that includes a protrusion 30C having a support section 42C, and a key section 44C that includes a key region 46C. The protrusion 30C has a protrusion length 70C which is greater than the protrusion length 70B of the protrusion 30B illustrated in FIG. 2B. Stated another way, the key region 46C of the protrusion 30C is positioned further from the receiver wall 28C than the key region 46B of the protrusion 30B (illustrated in FIG. 2B).

FIG. 2D illustrates a portion of the cartridge drive 12D, including a protrusion pattern 32D having a protrusion 30D that includes a support section 42D, and a key section 44D having a key region 46D. The protrusion 30D has a protrusion length 70D which is greater than the protrusion lengths 70B, 70C of the protrusions 30B, 30C, illustrated in FIGS. 2B and 2C, respectively. Stated another way, the key region 46D of the protrusion 30D is positioned further from the receiver wall 28D than the key regions 46B, 46C of the protrusions 30B, 30C (illustrated in FIGS. 2B and 2C, respectively).

In an alternative embodiment (not shown), the protrusion pattern is substantially "E" shaped. Stated another way, the key section can include three key regions that cantilever from the support section. In further embodiments (not shown), the protrusion pattern can have more than three key regions that cantilever from the support section. The key regions can be evenly spaced or randomly spaced along the support section. Each key region within the key section can be substantially similarly shaped, or can have a different shape. Further, the key regions can be integrally formed with the support section, or the key regions can be separately formed and secured to the support section.

In another embodiment (not shown), the protrusion can omit the support section. In this embodiment, each key section is secured directly to the cartridge receiver such as one of the receiver walls or the receiver base, or to other components of the cartridge drive. For example, the protrusion pattern can include one or more protrusions that are each independently secured to the cartridge receiver without utilizing a support section.

In still another embodiment (not shown), the protrusion can omit the key section. In this embodiment, the protrusion includes only the support section, which can cantilever from the cartridge receiver or the receiver base. The support section in this embodiment acts as the key, which either fits within the recess of a compatible cartridge, or impedes full insertion of an incompatible cartridge into the cartridge receiver.

The protrusion(s) 30 described above can be formed from various sufficiently rigid and/or durable materials such as aluminum or other metals, plastics, epoxy resins or ceramics, as non-exclusive examples.

Figure 3A:
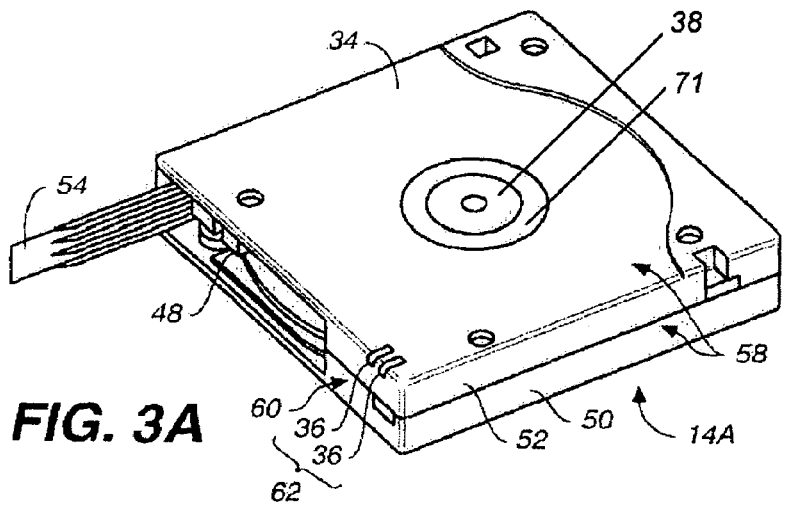
FIG. 3A is a bottom perspective view of an embodiment of the cartridge having features of the present invention.
Figure 3B:
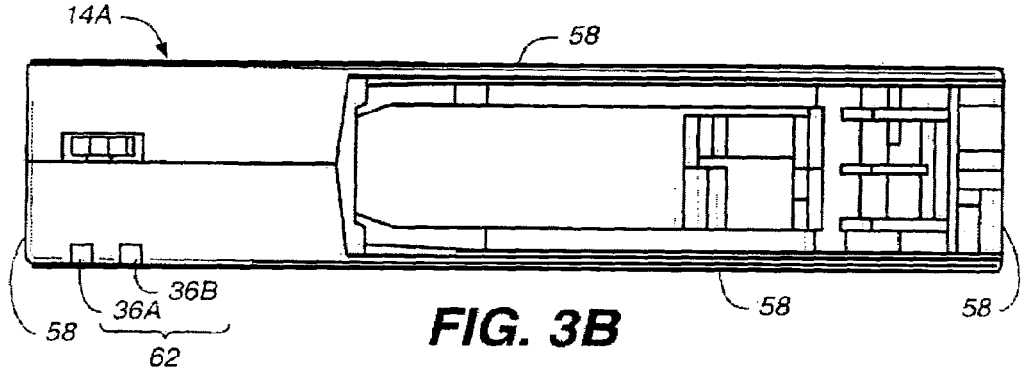
FIG. 3B is an end view of the cartridge illustrated in FIG. 3A.

FIGS. 3A and 3B illustrate a cartridge 14A having a compatibility scheme consistent with the cartridge drive 12A illustrated in FIG. 2A. For example, the cartridge 14A in FIG. 3A includes a substantially rectangular cartridge housing 34 defining a cartridge interior 48. The cartridge housing 34 includes a first cartridge section 50 and a second cartridge section 52 that are mounted together. In the embodiment illustrated in FIG. 3A, the cartridge housing 34 includes four cartridge side walls 58 (only two cartridge side walls 58 are shown), a cartridge rear wall 60 and a cartridge front wall (not shown) opposite the cartridge rear wall 60. The cartridge rear wall 60 includes a pivotal door 54 that moves to an open position (as illustrated in FIG. 3A) upon insertion of the cartridge 14A into the cartridge drive 12 in order to expose a portion of the reel 38. During storage of the cartridge 14A, the pivotal door 54 remains in a closed position so that the pivotal door 54 is substantially flush with the remaining portion of the cartridge rear wall 60. A portion of the reel 38 is also exposed through a reel aperture 71 in one of the cartridge side walls 58, as illustrated in FIG. 3A.

Further, the cartridge housing 34 includes one or more of the recesses 36 that form a recess pattern 62. The recess pattern 62 either (i) accepts the protrusion pattern 32 of the cartridge drive 12 (indicating a compatible cartridge), or (ii) does not accept the protrusion pattern 32 of the cartridge drive 12 (indicating an incompatible cartridge). Stated another way, the compatible cartridge is not impeded by the protrusion pattern 32 of the cartridge drive 12, and full insertion can therefore occur. In contrast, a newer generation of cartridge 14 relative to the cartridge drive 12 may or may not be functionally compatible with the cartridge drive 12 depending upon the design of the cartridge 14 and the cartridge drive 12. In this event, the protrusion pattern 32 of the cartridge drive 12 will contact the cartridge rear wall 60 and/or another portion of the cartridge housing 34, thereby inhibiting full insertion of the incompatible cartridge into the cartridge drive 12. With this design, damage to the cartridge 14 and/or the cartridge drive 12 is inhibited or completely avoided.

The design of the recess pattern 62 of the cartridge 14A can vary to suit the design requirements for compatibility with specific cartridge drives 12. The one or more recesses 36 that form the recess pattern 62 can be formed in one or both of the cartridge sections 50, 52. In FIG. 3A, the recesses 36 are rectangular shaped indentations in the second cartridge section 52 of the cartridge housing 34. Alternatively, each recess 36 can have a triangular, semi-circular, wedge-shaped or cylindrical shaped cross-section, or can be configured in any other suitable geometry, provided the recess 36 indents inwardly into the cartridge housing 34.

The recess pattern 62 can be formed at least partially in the cartridge rear wall 60, as illustrated in FIG. 3A. In this embodiment, each recess 36 is positioned both along the cartridge rear wall 60 and along one of the cartridge side walls 58. Each recess 36 can alternatively be positioned in other suitable locations. For example, the recesses 36 can be positioned along the cartridge rear wall 60 and two of the cartridge side walls 58, or only along the cartridge rear wall 60, as non-exclusive examples.

Further, in this embodiment, the recess pattern 62 does not provide access to the cartridge interior 48. Stated another way, the recess pattern 62 does not provide an avenue for ingress into or egress out of the cartridge interior 48. Rather, the recess 36 forms an indentation in the cartridge housing 34 without penetrating through the material of the cartridge housing 34. In alternate embodiments (not shown), the recess 36 can be an aperture that leads into the cartridge interior 48.

FIG. 3B is an end view of the cartridge 14A illustrated in FIG. 3A, including the four cartridge side walls 58. In this embodiment, the recess pattern 62 includes a first recess 36A and a second recess 36B. The recess pattern 62 allows the cartridge 14A to be compatible with at least four generations of cartridge drives 12 (one example is illustrated in FIG. 2A). For example, the cartridge 14A can be compatible with a first generation of cartridge drive 12 having a protrusion 30 positioned to interface with the first recess 36A, a second generation of cartridge drive having a protrusion 30 positioned to interface with the second recess 36B, a third generation of cartridge drive 12 having a protrusion pattern 32 positioned to interface with the first and second recesses 36A, 36B (similar to the cartridge drive 12 illustrated in FIG. 2A), and a fourth generation of cartridge drive 12 having no protrusions. Because of the wide variance in the potential positioning of each recess 36, numerous recess patterns 62, each representing a new generation of cartridge 14, can be utilized. The compatibility scheme provided herein can allow for literally dozens of generations of cartridge drives 12 and cartridges 14, with compatibility that can be easily and cost-effectively controlled.

Figure 3C:
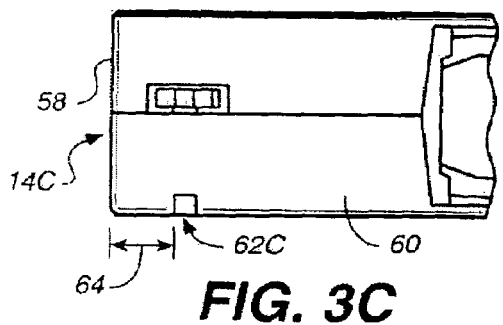
FIG. 3C is a partial side view of an embodiment of the cartridge.
Figure 3D:
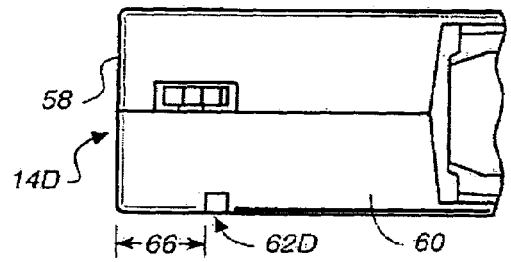
FIG. 3D is a partial side view of another embodiment of the cartridge.
Figure 3E:
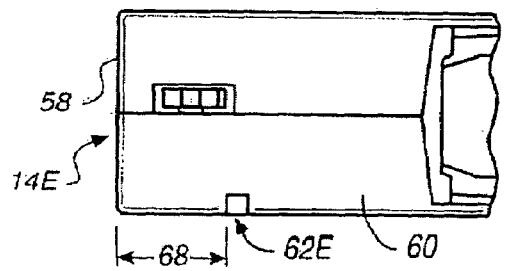
FIG. 3E is a partial side view of still another embodiment of the cartridge.

FIGS. 3C-3E collectively illustrate examples of a family of cartridges 14C-14E that have a compatibility scheme consistent with the cartridge drives 12B-12D (previously described relative to FIGS. 2B-2D). The positioning and configuration of the recess patterns 62C-62E can indicate a different generation of cartridge 14C-14E that is compatible with only one generation of cartridge drive 12. For example, FIGS. 3C-3E illustrate a three generation compatibility scheme. Importantly, any compatibility scheme according to the present invention can include greater or fewer than three generations.

In the embodiment illustrated in FIG. 3C, the recess pattern 62C is positioned at a first horizontal distance 64 from one of the cartridge side walls 58 along the cartridge rear wall 60, which can be indicative of a first generation of the cartridge 14. This first generation of cartridge 14 is compatible with the cartridge drive 12 illustrated in FIG. 2B because the protrusion length 70B, and thus, the positioning of the key region 46B of the protrusion 30B, aligns with the positioning of the recess pattern 62C.

Somewhat similarly, if a recess pattern 62D were positioned at a second horizontal distance 66 (illustrated in FIG. 3D) from the cartridge side wall 58 along the cartridge rear wall 60, this positioning could indicate a second generation of the cartridge 14D. This second generation of cartridge 14D is compatible with the cartridge drive 12C illustrated in FIG. 2C because the protrusion 30C aligns with the recess pattern 62D. In contrast, the second generation of the cartridge 14D as illustrated in FIG. 3D would not be compatible with the first generation of the cartridge drive 12B (illustrated in FIG. 2B, for example) having a protrusion pattern 32B that is positioned to accept the first generation of cartridge 14C as illustrated in FIG. 3C. Instead, an attempt to fully insert the second generation cartridge 14D into the first generation cartridge drive 12B would result in the protrusion 30B contacting the cartridge rear wall 60 of the cartridge 14D, thereby impeding full insertion of the cartridge 14D into the cartridge drive 12B. With this design, incompatibility between the cartridge 14D and the cartridge drive 12B does not result in damage to the components of the cartridge 14D or the cartridge drive 12B.

FIG. 3E illustrates an example of the third generation of cartridge 14E. In this example, a recess pattern 62E is positioned at a third horizontal distance 68 from the cartridge side wall 58 the cartridge rear wall 60. The cartridge 14E illustrated in FIG. 3E would not be compatible with the cartridge drives 12B, 12C illustrated in FIG. 2B or 2C, which have a protrusion patterns 32B, 32C designed to be inserted into the first or second generation of cartridge 14C, 14D as illustrated in FIGS. 3C and 3D, respectively.

Alternately, the recess pattern 62 can be positioned at various vertical locations along one or more of the cartridge side walls 58 or the cartridge rear wall 60 to distinguish various generations of cartridges 12. Still alternately, the recess pattern 62 can utilize both horizontally and vertically positioned recesses 36 to distinguish various generations of cartridges 14.

Figure 4A:
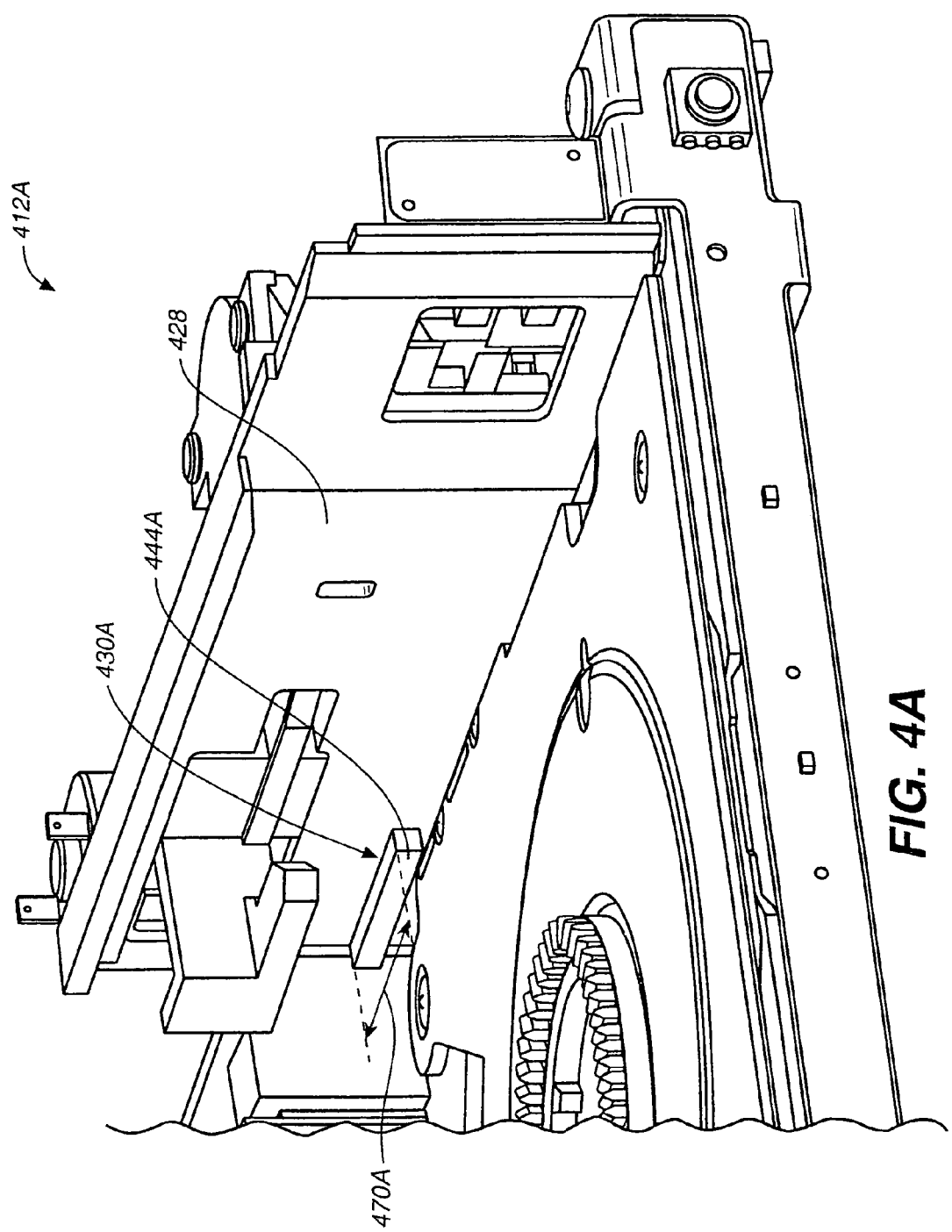
FIG. 4A is a top perspective view of another embodiment of a portion of the cartridge drive having features of the present invention.
Figure 4B:
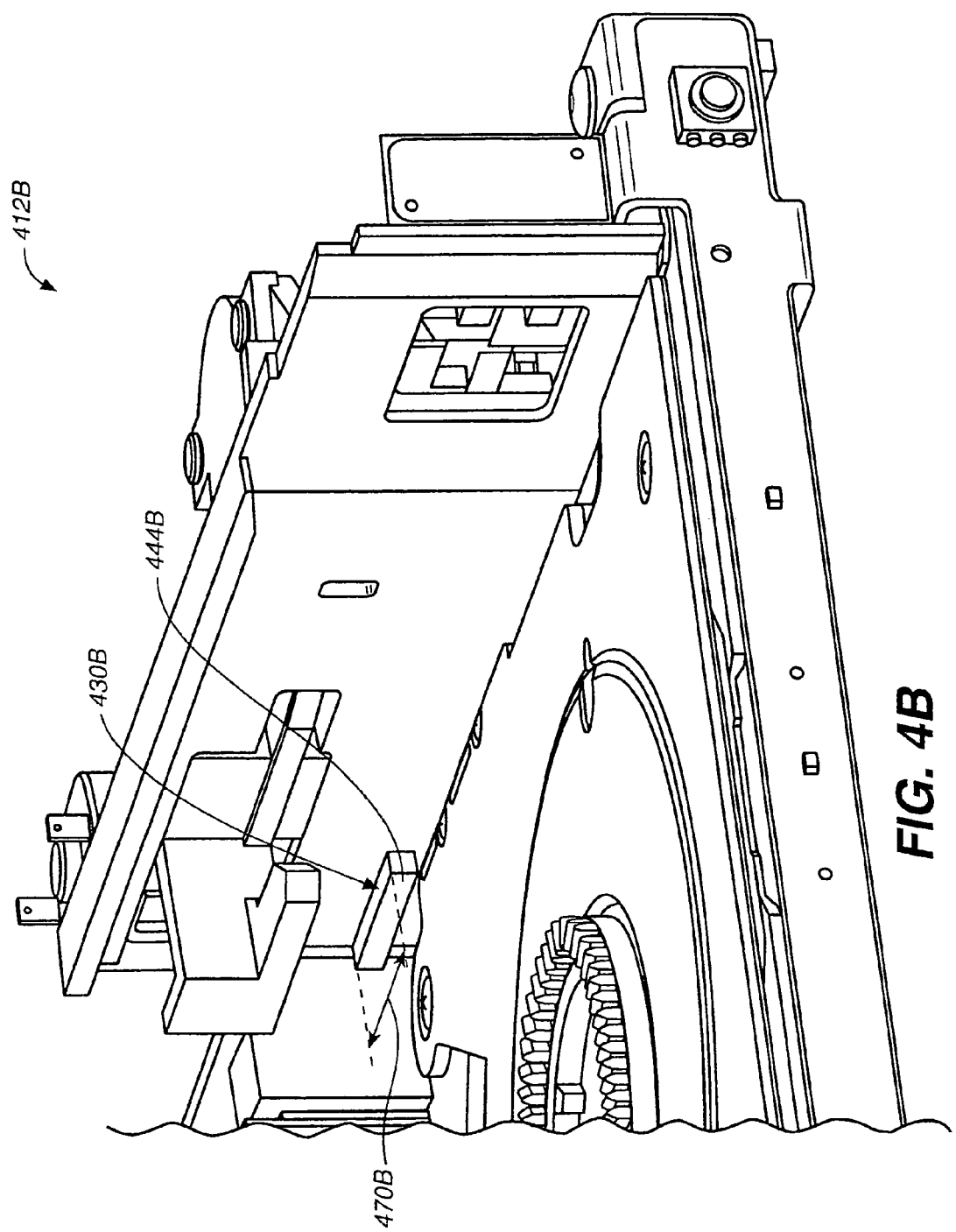
FIG. 4B is a top perspective view of still another embodiment of a portion of the cartridge drive.
Figure 4C:
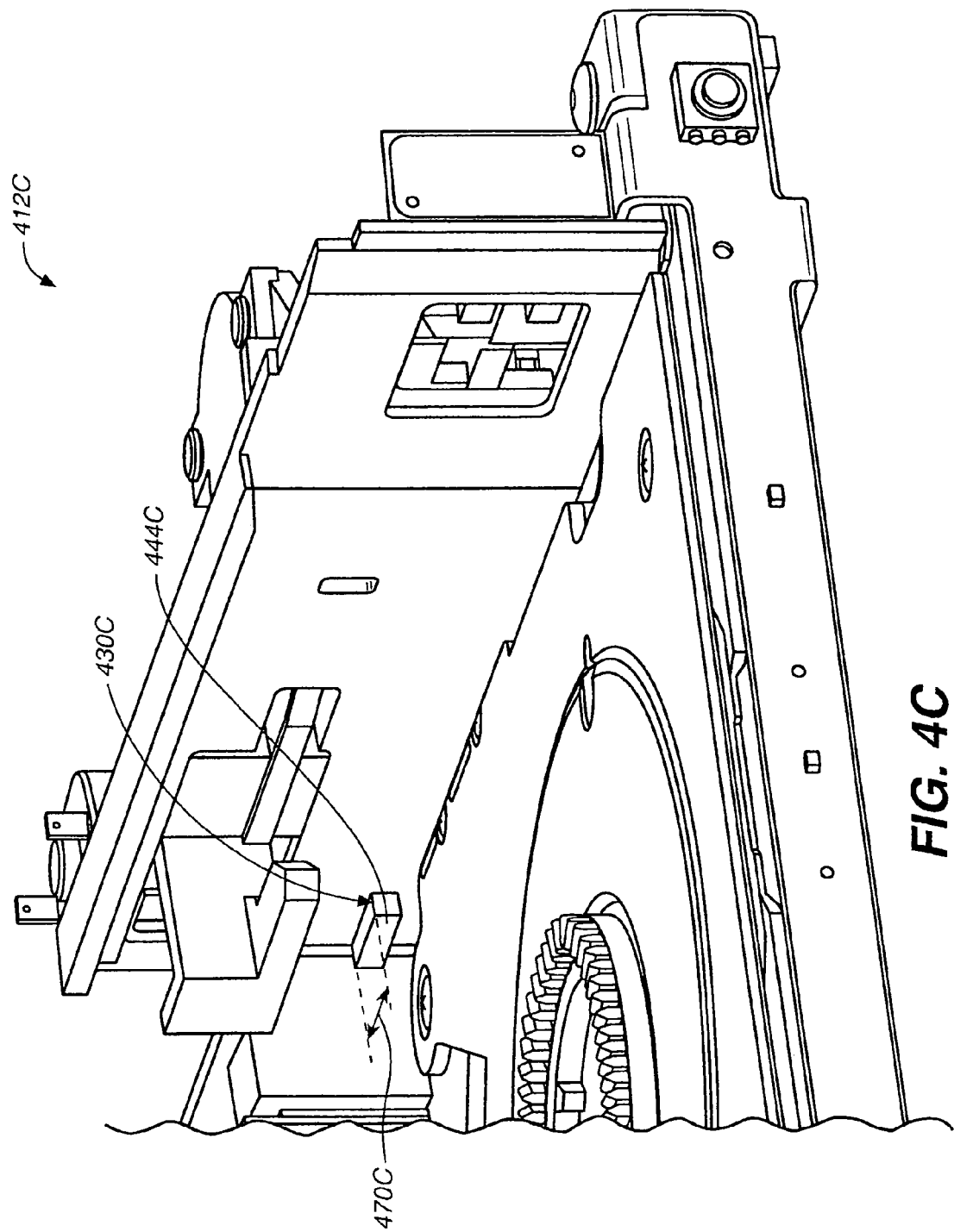
FIG. 4C is a top perspective view of yet another embodiment of a portion of the cartridge drive.

FIGS. 4A-4C collectively illustrate another family of cartridge drives 412A-412C. FIG. 4A is an example of a first generation of cartridge drive 412A that includes a protrusion 430A having a key section 444A that is secured directly to one of the receiver walls 428. The protrusion 430A illustrated in FIG. 4A has a substantially rectangular shaped cross-section. However, as previously described, other shapes can be utilized.

The protrusion 430A in FIG. 4A has a protrusion length 470A. The compatibility scheme of the cartridge drive 412A-412C illustrated in FIGS. 4A-4C includes varying the protrusion length as necessary from one generation of cartridge drive to the next. One example of such a compatibility scheme is to decrease the protrusion length 470 for each subsequent generation of cartridge drive.

FIG. 4B illustrates a second generation of the cartridge drive 412B having a protrusion 430B having a key section 444B. The protrusion 430B has a protrusion length 470B that is somewhat shorter than the protrusion length 470A of the protrusion 430A illustrated in FIG. 4A. In alternate embodiments, the protrusion length 470B can be approximately 20%, 30%, 40%, 50%, 60%, 70%, 80% or 90% of the protrusion length 470A.

Moreover, FIG. 4C illustrates a third generation of the cartridge drive 412C having a protrusion 430C having a key section 444C. The protrusion 430C has a protrusion length 470C that is somewhat shorter than the protrusion length 470B of the protrusion 430B illustrated in FIG. 4B. In alternate embodiments, the protrusion length 470C can be approximately 20%, 30%, 40%, 50%, 60%, 70%, 80% or 90% of the protrusion length 470B. With this design, a cartridge 414A (illustrated in FIG. 5A, for example) that is compatible with the first generation of cartridge drive 412A will continue to be compatible with subsequent generations of cartridge drives 412B, 412C. However, a newer cartridge 414 can be manufactured which is either compatible or incompatible with older generations of cartridge drives, as required.

Figure 5A:
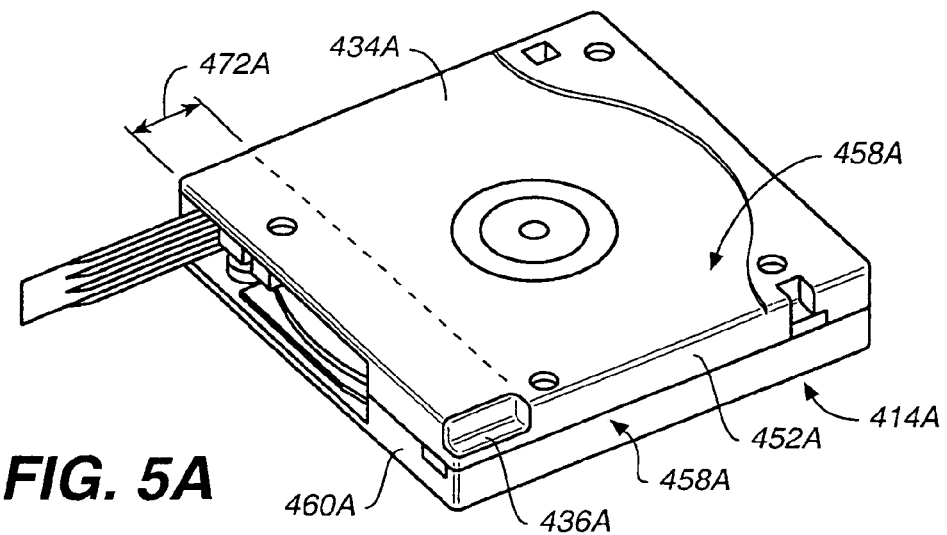
FIG. 5A is a bottom perspective view of another embodiment of the cartridge having features of the present invention.

FIGS. 5A-5E illustrate examples of cartridges 414A, 414C, 414D, 414E that have a compatibility scheme consistent with the cartridge drive 412A-412C (previously described relative to FIGS. 4A-4C). For example, the cartridge 414A in FIG. 5A illustrates an embodiment of the cartridge 414A including a recess 436A having a recess length 472A. The recess length 472A is designed to either accept the protrusion or not accept the protrusion of a particular generation of the cartridge drive 412. Thus, the compatible cartridge is not impeded by the protrusion of the cartridge drive 412, and full insertion can therefore occur. Contrarily, a newer generation of cartridge 414A relative to the cartridge drive 412 may or may not be compatible with the cartridge drive 412 depending upon the design of the cartridge 414A and the cartridge drive 412. In this event, the protrusion length 470A of may be greater than the recess length 472A. Thus, the protrusion 430A can contact the cartridge rear wall 460A and/or another portion of the cartridge housing 434A, thereby inhibiting full insertion of the incompatible cartridge into the cartridge drive 412. With this design, the likelihood of damage to the cartridge 414A and/or the cartridge drive 412 is decreased.

Figure 5B:
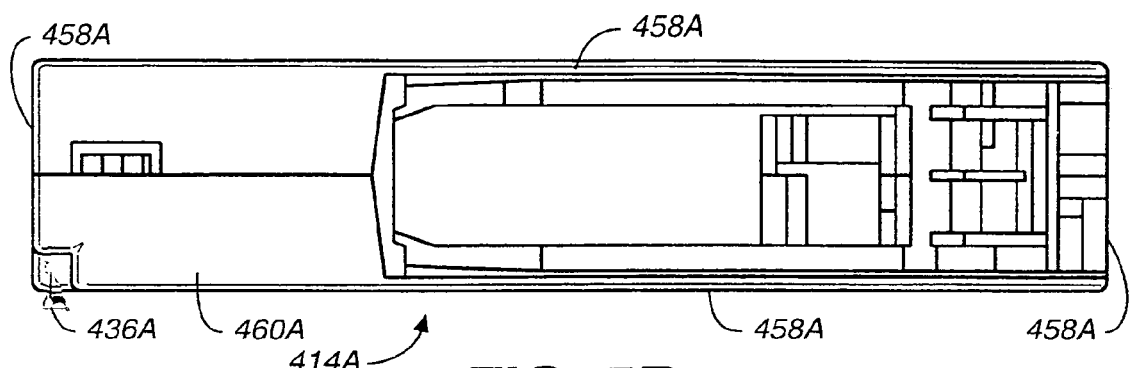
FIG. 5B is an end view of the cartridge illustrated in FIG. 5A.

In FIG. 5A, the recess 436A is a rectangular shaped indentation in the second cartridge section 452A of the cartridge housing 434A. The recess 436A is formed at least partially in the cartridge rear wall 460A, as illustrated in FIG. 5A. In this embodiment, each recess 436A is positioned both along the cartridge rear wall 460A and two of the cartridge side walls 458A. Each recess 436A can alternatively be positioned in other suitable locations. FIG. 5B is an end view of the cartridge 414A illustrated in FIG. 5A, which illustrates an example of the positioning of the recess 436A relative to the cartridge side walls 458A and the cartridge rear wall 460A.

Figure 5C:
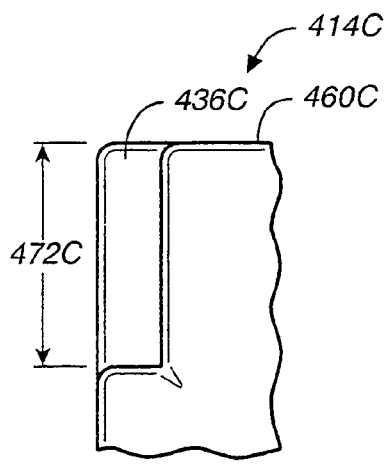
FIG. 5C is a partial side view of an embodiment of the cartridge.
Figure 5D:
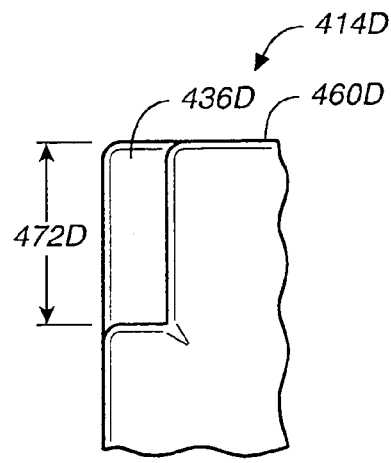
FIG. 5D is a partial side view of another embodiment of the cartridge.
Figure 5E:
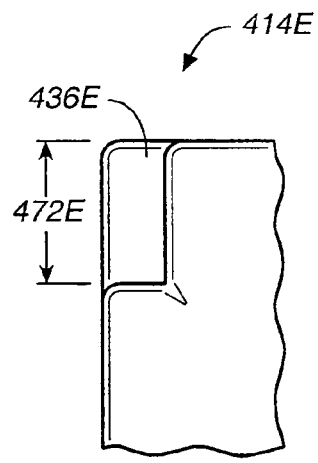
FIG. 5E is a partial side view of still another embodiment of the cartridge.

As provided above, the recess length 472A can indicate a different generation of cartridge 414A that is compatible with only one generation of cartridge drive 412. For example, FIGS. 5C-5E illustrate cartridges 414C-414E having a three generation compatibility scheme. In the embodiment illustrated in FIG. 5C, the recess 436C has a first recess length 472C, which can be indicative of a first generation of the cartridge 414C. The first generation of cartridge 414C can be compatible with the first generation of cartridge drive 412A illustrated in FIG. 4A.

FIG. 5D illustrates the cartridge 414D with a recess 436D having a second recess length 472D that is shorter than the first recess length 472C. In alternate embodiments, the second recess length 472D is approximately 20%, 30%, 40%, 50%, 60%, 70%, 80% or 90% of the first recess length 472C. In this example, the second generation of the cartridge 414 as illustrated in FIG. 5D would not be compatible with the first generation of the cartridge drive 412A (illustrated in FIG. 4A) having a protrusion 430A that is positioned to interface with the first generation of cartridge 414C as illustrated in FIG. 5C. Instead, an attempt to fully insert the second generation cartridge 414D into the first generation cartridge drive 412A would result in the protrusion 430A contacting the cartridge rear wall 460D, thereby impeding full insertion of the cartridge 414D into the cartridge drive 412A.

FIG. 5E illustrates an example of the third generation of the cartridge 414E. In this example, the recess 436E has a third recess length 472E that is shorter than both of the recess lengths 472C, 472D illustrated in FIGS. 5C and 5D, respectively. In alternate embodiments, the third recess length 472E is approximately 20%, 30%, 40%, 50%, 60%, 70%, 80% or 90% of the second recess length 472D. The cartridge 414E illustrated in FIG. 5E would not be compatible with the cartridge drives 412A, 412B (illustrated in FIGS. 4A and 4B, respectively) including protrusions 430A, 430B having a protrusion lengths 470A, 470B that are designed to substantially fill the recesses 436C, 436D of the first or the second generation of cartridge 414C, 414D as illustrated in FIGS. 5C and 5D, respectively.

The present invention permits the design of a tape library system (not shown) comprised of both older and newer cartridge drives 12 without risk of a new cartridge 14 entering an old cartridge drive 12 within the tape library system. Moreover, the tape library system can simultaneously employ both older cartridges and newer cartridges 14, the latter having principles of the present invention, again without risk of an incompatible cartridge entering an older cartridge drive, for instance. This feature is particularly advantageous in upgrading/retrofitting preexisting tape library systems with cartridge drives 12 and cartridges 14.

The above described cartridge 14 having the minimal form factor modifications and including the recesses satisfies the need of allowing older tape cartridges to be used in new cartridge drives 12 without the possibility of newer cartridges 14 being inserted into older cartridge drives. Consequently, problems associated with leader run away resulting from missed buckling and with data being overwritten or erased accidentally are reduced or eliminated.

While the particular data storage system 10, cartridge drive 12 and cartridge 14 as herein shown and disclosed in detail are fully capable of satisfying the needs and providing the advantages herein before stated, it is to be understood that the embodiments illustrated are merely illustrative of the presently preferred embodiments of the invention and that no limitations are intended to the details of construction or design herein shown other than as described in the appended claims.

What is claimed is:

1. A method for inhibiting damage to a cartridge drive, the method comprising the steps of:
   providing a first cartridge drive having a first protrusion pattern including n protrusions;
   providing a second cartridge drive with a substantially similar form factor as the first cartridge drive, the second cartridge drive having a second protrusion pattern including greater than n protrusions, each protrusion pattern impeding full insertion of an incompatible cartridge into the corresponding cartridge drive; and
   partially inserting a first cartridge alternately into the first cartridge drive and the second cartridge drive, the first cartridge including (i) a first cartridge housing having a substantially planar first cartridge wall with a reel aperture, and (ii) a rotatable reel having a portion that is partially exposed through the reel aperture, the first cartridge wall including at least a portion of a first recess pattern that is sized and positioned to fully receive the first protrusion pattern to allow full insertion of the cartridge into the first cartridge drive, the first recess pattern being sized and positioned to not fully receive the second protrusion pattern so that full insertion of the first cartridge into the second cartridge receiver is impeded.

2. The method of claim 1 further comprising the step of partially inserting a second cartridge having a substantially similar form factor as the first cartridge into the second cartridge drive, the second cartridge including (i) a second cartridge housing having a second cartridge wall with a reel aperture, and (ii) a rotatable reel having a portion that is partially exposed through the reel aperture, the second cartridge wall including at least a portion of a second recess pattern that is positioned to fully receive the second protrusion pattern to allow full insertion of the second cartridge into the second cartridge drive.

3. The method of claim 2 wherein the first recess pattern includes one recess.

4. The method of claim 3 wherein the second recess pattern includes two recesses.

5. The method of claim 1 wherein the step of partially inserting a first cartridge includes providing the first cartridge housing with a pair of substantially perpendicular first cartridge walls, and providing the first recess pattern to have two recesses that are only formed into the same pair of first cartridge walls of the first cartridge housing as one another.

6. The method of claim 1 wherein the step of partially inserting a first cartridge includes fully inserting the first cartridge without the first protrusion pattern contacting a door of the first cartridge.

7. A family of cartridges having selective compatibility with a first cartridge drive and a second cartridge drive, the first cartridge drive having a first protrusion pattern and a first cartridge receiver, and the second cartridge drive having a second protrusion pattern that is different than the first protrusion pattern and a second cartridge receiver, the family of cartridges comprising:
   a first cartridge that is alternately at least partially received by each of the cartridge drives, the first cartridge including (i) a first cartridge housing having a substantially planar first cartridge wall with a reel aperture, (ii) a rotatable reel having a portion that is partially exposed through the reel aperture, and (iii) a first recess pattern that is at least partially formed into the first cartridge wall, the first recess pattern alternately receiving the first and second protrusion patterns so that the first cartridge is alternately fully inserted into the first and second cartridge receivers; and
   a second cartridge having a substantially similar form factor as the first cartridge, the second cartridge being at least partially received by each of the cartridge drives, the second cartridge including (i) a second cartridge housing having a substantially planar second cartridge wall with a reel aperture, (ii) a rotatable reel having a portion that is partially exposed through the reel aperture, and (iii) a second recess pattern that is at least partially formed into the second cartridge wall, the second recess pattern receiving the second protrusion pattern to allow full insertion of the second cartridge into the second cartridge receiver, the second recess pattern not fully receiving the first protrusion pattern so that full insertion of the second cartridge into the first cartridge receiver is impeded.

8. The family of cartridges of claim 7 wherein the first recess pattern has a first recess length and the second recess pattern has a second recess length that is shorter than the first recess length.

9. The family of cartridges of claim 7 wherein the second recess pattern is not aligned with the first protrusion pattern during insertion of the second cartridge into the first cartridge receiver so that full insertion of the second cartridge into the first cartridge receiver is impeded.

10. The family of cartridges of claim 7 wherein the second recess pattern has a length that is shorter than a length of the first protrusion pattern so that full insertion of the second cartridge into the first cartridge receiver is impeded.

11. The family of cartridges of claim 7 wherein the first recess pattern includes one or more recesses and the second recess pattern includes one or more recesses, and wherein the second recess pattern includes fewer recesses than the first recess pattern.

12. The family of cartridges of claim 7 wherein the first cartridge housing includes a first cartridge side wall that is substantially perpendicular to the first cartridge wall, and wherein the first recess pattern is at least partially positioned along the first cartridge side wall.

13. The family of cartridges of claim 7 wherein the second cartridge housing includes a second cartridge side wall that is substantially perpendicular to the second cartridge wall, and wherein the second recess pattern is at least partially positioned along the second cartridge side wall.

14. A combination including the family of cartridges of claim 7 and a family of cartridge drives.

15. The family of cartridges of claim 7 wherein the cartridge housing of one of the cartridges includes a pair of substantially perpendicular walls, and wherein the recess pattern of the one of the cartridges includes two recesses that each are positioned along the same pair of perpendicular walls as one another.

16. A combination comprising:
a first cartridge drive including a first protrusion pattern having n protrusions;
a second cartridge drive having a substantially similar form factor as the first cartridge drive, the second cartridge drive including a second protrusion pattern having less than n protrusions;
a first cartridge that is alternately at least partially received by each of the cartridge drives, the first cartridge including (i) a first cartridge housing having a substantially planar first cartridge wall with a reel aperture, (ii) a rotatable reel having a portion that is partially exposed through the reel aperture, and (iii) a first recess pattern that is at least partially formed into the first cartridge wall, the first recess pattern alternately receiving the first and second protrusion patterns so that the first cartridge is alternately fully inserted into the first and second cartridge receivers; and
a second cartridge having a substantially similar form factor as the first cartridge, the second cartridge being at least partially received by each of the cartridge drives, the second cartridge including (i) a second cartridge housing having a substantially planar second cartridge wall with a reel aperture, (ii) a rotatable reel having a portion that is partially exposed through the reel aperture, and (iii) a second recess pattern that is at least partially formed into the second cartridge wall, the second recess pattern receiving the second protrusion pattern to allow full insertion of the second cartridge into the second cartridge receiver, the second recess pattern not fully receiving the first protrusion pattern so that full insertion of the second cartridge into the first cartridge receiver is impeded.

17. The combination of claim 16 wherein the first cartridge includes a first cartridge side wall that is substantially perpendicular to the first cartridge wall, and wherein the first recess pattern is at least partially positioned along the first cartridge side wall.

18. The combination of claim 17 wherein the second cartridge includes a second cartridge side wall that is substantially perpendicular to the second cartridge wall, and wherein second recess pattern is at least partially positioned along the second cartridge side wall.

19. The combination of claim 16 wherein the first cartridge drive includes a first cartridge receiver having a first receiver wall that is substantially perpendicular to the first cartridge wall when the first cartridge is at least partially positioned in the first cartridge receiver, and wherein the first protrusion pattern is secured to the first receiver wall of the first cartridge drive.

20. The combination of claim 19 wherein the second cartridge drive includes a second cartridge receiver having a second receiver wall that is substantially perpendicular to the second cartridge wall when the second cartridge is at least partially positioned in the second cartridge receiver, and wherein the second protrusion pattern is secured to the second receiver wall of the second cartridge drive.

21. A family of cartridge drives that are adapted to be used with a first cartridge and a second cartridge each having a substantially similar form factor, the first cartridge having a substantially planar first cartridge wall with a first reel aperture, and a first reel that is at least partially exposed through the first reel aperture, and a first recess pattern positioned at least partly along the first cartridge wall, the second cartridge having a substantially planar second cartridge wall with a second reel aperture, and a second reel that is at least partially exposed through the second reel aperture, and a second recess pattern that is positioned at least partly along the second cartridge wall the second recess pattern being different than the first recess pattern, the family of cartridge drives comprising:
a first cartridge drive including (i) a first cartridge receiver, and (ii) a first protrusion that is configured to extend into the first recess pattern and allow full insertion of the first cartridge into the first cartridge receiver, the first protrusion being configured relative to the second recess pattern so that the first protrusion impedes full insertion of the second cartridge into the first cartridge receiver; and
a second cartridge drive having a substantially similar form factor as the first cartridge drive, the second cartridge drive including (i) a second cartridge receiver, and (ii) a second protrusion that is configured to extend into the first recess pattern and allow full insertion of the first cartridge into the second cartridge receiver, the second protrusion being configured to extend into the second recess pattern and allow full insertion of the second cartridge into the second cartridge receiver.

22. The family of cartridge drives of claim 21 wherein the first cartridge receiver includes a first receiver wall that is substantially perpendicular to the first cartridge wall when the first cartridge is at least partially positioned in the first cartridge receiver, and wherein the first protrusion cantilevers from the first receiver wall.

23. The family of cartridge drives of claim 22 wherein the second cartridge receiver includes a second receiver wall that is substantially perpendicular to the second cartridge wall when the second cartridge is at least partially positioned in the second cartridge receiver, and wherein the second protrusion cantilevers from the second receiver wall.

24. The family of cartridge drives of claim 21 wherein the first protrusion includes a plurality of key regions that each is adapted to extend into the first recess pattern.

25. The family of cartridge drives of claim 24 wherein the second protrusion includes at least one key region that is adapted to extend into the second recess pattern.

26. The family of cartridge drives of claim 25 wherein the second protrusion includes fewer key regions than the first protrusion.

27. The family of cartridge drives of claim 21 wherein the first protrusion does not align with the second recess pattern so that the first protrusion impedes full insertion of the second cartridge into the first cartridge receiver.

28. The family of cartridge drives of claim 21 wherein the first protrusion has a length that is greater than a length of the second recess pattern so that the first protrusion impedes full insertion of the second cartridge into the first cartridge receiver.

29. The family of cartridge drives of claim 21 wherein the second protrusion includes a plurality of key regions that each is adapted to extend into the first recess pattern and the second recess pattern to alternately allow full insertion of the first cartridge and the second cartridge into the second cartridge receiver.

30. The family of cartridge drives of claim 21 wherein the first cartridge receiver includes a first receiver base that is substantially parallel to the first cartridge wall when the first cartridge is at least partially positioned within the first cartridge receiver, and wherein the first protrusion is secured to the first receiver base.

31. A combination comprising:
a first cartridge drive including a first protrusion pattern having one first protrusion;
a second cartridge drive having a substantially similar form factor as the first cartridge drive, the second cartridge drive including a second protrusion pattern having greater than one second protrusions, at least one of the second protrusions being substantially similar in size to the first protrusion;
a first cartridge that is alternately at least partially received by each of the cartridge drives, the first cartridge including (i) a first cartridge housing having a substantially planar first cartridge wall with a reel aperture, (ii) a rotatable reel having a portion that is partially exposed through the reel aperture, and (iii) a first recess pattern that is at least partially formed into the first cartridge wall, the first recess pattern alternately receiving the first and second protrusion patterns so that the first cartridge is alternately fully inserted into the first and second cartridge receivers; and
a second cartridge having a substantially similar form factor as the first cartridge, the second cartridge being at least partially received by each of the cartridge drives, the second cartridge including (i) a second cartridge housing having a substantially planar second cartridge wall with a reel aperture, (ii) a rotatable reel having a portion that is partially exposed through the reel aperture, and (iii) a second recess pattern that is at least partially formed into the second cartridge wall, the second recess pattern receiving the first protrusion pattern to allow full insertion of the second cartridge into the first cartridge receiver, the second recess pattern not fully receiving the second protrusion pattern so that full insertion of the second cartridge into the second cartridge receiver is impeded.

* * * * *

UNITED STATES PATENT AND TRADEMARK OFFICE
CERTIFICATE OF CORRECTION

| | | |
|---|---|---|
| PATENT NO. | : 7,427,043 B2 | Page 1 of 1 |
| APPLICATION NO. | : 10/225760 | |
| DATED | : September 23, 2008 | |
| INVENTOR(S) | : Stamm et al. | |

It is certified that error appears in the above-identified patent and that said Letters Patent is hereby corrected as shown below:

On the Title Page, Item (73)

Please substitute -- Quantum Corporation -- for the assignee instead of "Quantrum Corporation" on the front page of the patent.

Signed and Sealed this

Ninth Day of December, 2008

JON W. DUDAS
*Director of the United States Patent and Trademark Office*